United States Patent [19]

Ruetschle et al.

[11] Patent Number: 5,263,918
[45] Date of Patent: Nov. 23, 1993

[54] MACHINE TOOL

[75] Inventors: Eugen Ruetschle, Muehlheim; Hans-Henning Winkler, Tuttlingen; Rudolf Hanninger, Seitingen-Oberflacht, all of Fed. Rep. of Germany

[73] Assignee: Chiron-Werke GmbH & Co. KG, Tuttlingen, Fed. Rep. of Germany

[21] Appl. No.: 774,046

[22] Filed: Oct. 7, 1991

[30] Foreign Application Priority Data

Oct. 9, 1990 [DE] Fed. Rep. of Germany ....... 4031991

[51] Int. Cl.⁵ .......................... B23Q 3/157; B23C 1/06
[52] U.S. Cl. .................................. 483/10; 408/239 R; 409/231; 483/34; 483/900
[58] Field of Search ................. 29/568; 409/231, 232, 409/233, 234; 408/239 R; 483/900, 10, 12, 34, 35, 7

[56] References Cited

U.S. PATENT DOCUMENTS

| 3,520,228 | 7/1970 | Wohlfeil | 409/233 |
| 3,844,028 | 10/1974 | Hague et al. | 409/233 X |
| 3,851,562 | 12/1974 | Tomita et al. | 29/568 X |
| 4,356,609 | 11/1982 | Wollermann | 29/568 X |
| 4,356,621 | 11/1982 | Tomita et al. | 29/568 |
| 4,557,035 | 12/1985 | Rutschle et al. | 29/26 A |
| 4,571,131 | 2/1986 | Date | 409/231 X |
| 4,832,545 | 5/1989 | Babel | 409/231 X |

FOREIGN PATENT DOCUMENTS

| 0258989 | 7/1987 | European Pat. Off. | |
| 3233934 | 9/1982 | Fed. Rep. of Germany | |
| 3503637 | 2/1985 | Fed. Rep. of Germany | |
| 48443 | 3/1982 | Japan | 409/233 |
| 73252 | 4/1984 | Japan | 409/234 |

Primary Examiner—William Briggs
Attorney, Agent, or Firm—Pretty, Schroeder, Brueggemann & Clark

[57] ABSTRACT

A machine tool has a spindle rotating in a headstock and has, further, a gripper for transferring a toolholder from an uncoupled position into a ready-to-couple position within the spindle. A coupling mechanism is provided for further transferring the toolholder from the ready-to-couple position to a couple position within the spindle in which the toolholder can be rigidly connected to the spindle for rotation therewith. In order to control the transferring steps, a sensor is provided for detecting whether the toolholder is in its couple position.

9 Claims, 4 Drawing Sheets

MACHINE TOOL

The present invention relates to a machine tool having a spindle which rotates in a headstock, and at least one gripper for transferring a toolholder from an uncoupled position into a ready-to-couple position in the spindle, and coupling means for transferring the toolholder from the ready-to-couple position into a coupled state in which the toolholder is connected with the spindle for rotation therewith.

A machine tool of the type described above is known from DE-OS 2 945 770.

In the case of the known machine tool, a toolholder, with a tool mounted therein, is inserted into the spindle by means of a gripper arm. The toolholder is held in the gripper arm for easy rotation by means of an antifriction bearing so that the gripper arm can remain fixed to the toolholder during the machining operation of the tool. This reduces the tool-change time as compared to the case that the gripper arm has to be moved away after mounting of the tool holder, and to be returned into position for the next tool change.

In order to effect a connection between the toolholder and the spindle which is fixed against relative rotation, the end face of the spindle facing the toolholder is equipped with a resiliently seated tongue end. The opposite end face of the toolholder, which is already aligned coaxially with the spindle, is provided with one or more grooves suited for receiving the tongue end. During insertion of the toolholder into the spindle, both the spindle and the toolholder are stationary. As a rule, the tongue end will not exactly find its way into the groove or one of the grooves, but will come to hit upon the otherwise plane end face of the toolholder so that the tongue end is pushed back into the spindle against the force of the spring. The spindle is then set into rotation, and the tongue end is expected to engage one of the grooves of the toolholder, permitting the spring to relax. The toolholder is then pulled home into the spindle and is locked hydraulically.

This procedure requires that as the spindle starts revolving, the tongue end will slide along the plane surface of the toolholder and "find" the corresponding groove. If this is to happen, the friction between the key and the end face of the toolholder must be greater than the friction prevailing in the antifriction bearing.

Once the spindle has been set into rotation, a predetermined period of time is permitted to lapse for safety reasons before the toolholder is pulled into the spindle by the clamping means. This is intended to ensure that the tongue end is positively locked in place in the groove. Locking of the key in the corresponding groove guarantees among other things that the toolholder is properly aligned with the spindle which is a requirement in particular for boring tools.

However, the tool-change time is undesirably long in the case of the known machine tool, due to the length of the predetermined waiting time.

DE-PS-3 339 619 describes a toolholder whose annular flange comprises what is called a brake bearing. As the toolholder is introduced into the spindle, the brake bearing brakes down the toolholder relative to the rotating spindle when the key arranged in the spindle comes to engage the corresponding end face of the toolholder. The relative speed between the spindle and the toolholder so produced permits the key to slide along the end face, to find the corresponding groove and snap into place therein and, thus, to establish a positive connection between the revolving spindle and the toolholder.

Once the toolholder has been drawn into the spindle, the surfaces of the brake bearing, which are in frictional contact with each other, are moved apart and the toolholder is permitted to revolve freely.

When the toolholder has been transferred into the ready-to-couple position, in which the key slides along the end face of the toolholder, a certain predetermined length of time is permitted to pass in the case of this arrangement, too, until the coupling mechanism is expected to have assumed its locked condition and the toolholder can be finally drawn into the spindle by the clamping means. However, due to the predetermined period of time that has to be waited, the tool-change time is undesirably long in this case, too. In addition, toolholders provided with a brake bearing are very complex as regards their design and, consequently, very costly. A particular drawback is seen in the fact that no standardized toolholders can be used.

DE-PS-3 620 364, therefore, proposes a gripper with which standardized toolholders can be employed, yet the beforedescribed brake mechanism is maintained. The standardized toolholders are equipped with an annular shoulder provided on its lower face with a conical surface tapering in downward direction. The gripper is eguipped with a second conical surface, which likewise tapers in downward direction. During introduction of the toolholder into the spindle, the toolholder bears upon this second conical surface at a certain frictional force which has a retarding effect for the toolholder relative to the key. In the operative condition of the toolholder, i.e. when the toolholder has been drawn into the spindle by the clamping means, the two conical surfaces are separated one from the other by an air gap so that the toolholder is permitted to revolve freely in the gripper.

This arrangement, too, requires a certain predetermined waiting time in order to be sure that the key has actually come to lock in the groove, before the clamping means can be permitted to pull the toolholder into the groove and the spindle can be run up from its coupling speed to its operating speed.

Now, it is the object of the present invention to improve a machine tool of the type described at the outset in such a way that the before-mentioned disadvantages are avoided and in particular the tool-change time is reduced, whereas the structure of the machine tool is kept simple, and coupling safety is increased Further, it is an object of the invention to enable standardized toolholders to be used.

According to the invention, this object is achieved by the fact that a sensor is provided for detecting the coupled condition.

This solves the object underlying the invention fully and perfectly because the coupling action is now detected so that it is now no longer necessary to wait for a predetermined length of time. Regardless of the frictional force acting between the toolholder and the gripper, it can now be ensured in the case of the new machine tool that the machine tool Will start operating only after the sensor has detected that the toolholder assumes its coupled position.

The machine tool according to the invention may be equipped with grippers which remain at the toolholder during operation of the tool, and also with grippers which release the toolholder once the latter has assumed its coupled position. The tool-change time is reduced to the shortest possible length in both cases. Whereas in the case of the prior art it absolutely may happen that only a small part of the entire predetermined waiting time has lapsed at the moment the toolholder is locked in position, the sensor of the machine tool according to the invention will terminate the waiting condition at this point. On the other hand, it may also happen in the case of the prior art that the tool holder is not yet in its coupled condition at the end of the predetermined waiting time, either because the latter is too short or because the friction between the toolholder and the gripper is too low. In these cases, which admittedly do not occur frequently, the sensor of the machine tool according to the invention ensures that the waiting time is extended until the toolholder actually assumes its coupled condition. In this connection, it is also possible to monitor the whole waiting time by means of an additional circuit which will generate an error signal if the coupling action actually takes too much time.

According to one particularly preferred embodiment of the invention, clamping means are provided which clamp the toolholder in the spindle once the sensor has detected that the toolholder is in its coupled condition.

This feature is of particular advantage because the toolholder will be clamped immediately after completion of the coupling action. This has the effect to clearly reduce the tool-change time as compared to the prior art, and to ensure in addition that the clamping means will become active only after proper coupling of the toolholder. i.e. when the latter has assumed a defined position relative to the spindle.

According to another preferred feature, a sequence control is provided which causes the spindle to run up once the sensor has detected the coupled condition of the toolholder.

Just as the preceding feature this feature provides the advantage that the machine tool assumes its operating position immediately after completion of the coupling action, without the need to await the end of an excessively long waiting period.

In this connection, it is further preferred if the coupling means comprise a tongue end which is mounted on the spindle for displacement in the longitudinal direction between at least two positions relative to the spindle and which in the coupled condition of the toolholder engages a recess provided on the latter, and if the sensor detects the position of the tongue end relative to the spindle.

This feature is of particular advantage because the coupled condition can be monitored very simply in this way. On the one hand, the sensor can detect the condition where the tongue end is in contact with the end face of the toolholder and is, thus, pressed into the spindle so that it can signal that the toolholder is in the ready-to-couple position, a fact which it derives from the relative position of the tongue end. When the tongue end then slides along the end face and gets locked in the corresponding groove, this will also be detected by the sensor, and immediately after completion of this locking action the sensor will signal that the coupled condition has been reached.

Consequently, this feature not only provides constructional advantages, but is also preferred under safety aspects since it is now possible, with the aid of the sensor, to determine exactly the length of time required by the tongue end for sliding along the end face and getting locked in the recess. This permits conclusions to be drawn as to the frictional force acting between the toolholder and the gripper.

According to another preferred feature, the sensor comprises a sensing element which revolves together with the spindle.

This feature is particularly advantageous because the sensor element is practically always "at the site" and there is no need to wait until the sensing element is in a convenient position to detect the coupled condition, which in the most unfavorable of all cases may take a full revolution of the spindle. This, too, has the effect to clearly reduce the tool-change time.

According to another preferred feature of the invention, the sensor comprises a detection unit which coacts with the sensing element and which is fixed against rotation, relative to the headstock.

This feature is of advantage insofar as the detection unit can be implemented by simple constructional means. The detection unit may consist, for example, of an optical receiver detecting a light beam which is either emitted, or at least reflected, by the sensing element.

In addition, an arrangement is preferred where the detection unit responds to the sensing element in any relative angular position between the spindle and the headstock.

This feature is of particular advantage because the coupled state will be signalled to the detection unit as soon as the coupling action has been completed. There is no need to wait for up to a full revolution of the spindle until the sensing element can transmit its information to the detection unit. This can be achieved, for example, by arranging a plurality of optical receivers along the circumference of the spindle, with overlapping receiving cones, so that the sensing element is constantly in the receiving cone of at least one receiver.

According to a particularly preferred feature of this arrangement, the sensing element comprises a signal rod mounted on the spindle for longitudinal displacement thereon, which rod coacts with the tongue end and follows the movement of the tongue end relative to the spindle.

It is the advantage of this feature that no signal delay time has to be allowed between the locking of the tongue end in the groove and the emission of the corresponding signal by the sensing element as the tongue end itself can be regarded as part of the sensing element. The displacement of the signal rod can be detected by optical or mechanical means, for example. If optical detection is chosen, a light beam may, for example, be reflected by the signal rod in different ways, depending on its different positions. Mechanical detection can be implemented, for example, by providing on the headstock, outside of the spindle, a switching ring which surrounds the spindle concentrically and which is slidingly engaged by the signal rod and entrained by the latter according to its change in position.

Further, it is preferred if the sensor comprises a signal ring, which is arranged concentrically to the spindle, is supported on the spindle in axial direction, and which coacts with the coupling means in such a way that when the toolholder is in the ready-to-couple condition, the signal ring occupies an axially first position, coacts continuously with a stationary measuring sensor and generates in the latter a first signal, and that in the coupled condition of the toolholder the signal ring occupies an axially second position and coacts, likewise continuously, with the stationary measuring sensor and generates in the latter a second signal.

This feature provides the advantage, which has already been discussed, that the signal is transferred continuously between the sensing element and the detection unit so that the coupled condition is detected and signalled momentarily. This can be effected either by optical detection means—as described above—or by the use of an inductive displacement sensing device or proximity switch which is damped by the signal ring in one of its positions. The inductive device, therefore, exhibits two states, one of them corresponding for example to the tongue end in its pushed-back position sliding along the end face of the toolholder, and the other corresponding to the tongue end is in its locked position in the groove or to the position of the tongue end in which it is fully released from the toolholder—which two positions are identical. During insertion and coupling of the toolholder, the tongue end runs through the following states:

At the beginning, the inductive displacement sensing device is damped, indicating on the one hand that the device is functional and, on the other hand, that a toolholder is not yet in contact with the tongue end. Now, when the end face of a toolholder comes to urge the tongue end into the spindle, the inductive device changes over to its undamped state indicating that a toolholder is in the ready-to-couple position. As soon as the tongue end gets locked in the groove, the inductive device gets damped again indicating that the coupled position has been assumed. This signal sequence drives a corresponding control which then takes care of actuating the clamping means and/or running up the spindle to its operating speed, once the toolholder is in its coupled state.

According to a further preferred feature, the gripper transfers the toolholder into the ready-to-couple position while the spindle is revolving.

This conventional feature provides the advantage that the tool spindle does not have to be stopped completely. This, too, leads to a reduction in tool-change time it being evident that a spindle revolving at a reduced coupling speed can be run up to its operating speed more rapidly than a stationary spindle.

According to another preferred feature, the toolholder is supported rotatably on the gripper and remains in the gripper even in the coupled state.

This likewise conventional measure provides the advantage that there is no need to withdraw the gripper after coupling and to return in into position before the next tool change. This also has the effect to considerably reduce the tool-change time.

Further, an arrangement is preferred where the gripper is adapted for receiving a standardized toolholder and comprises a conical surface, and the conical surface of the toolholder is in frictional contact with the conical surface of the gripper during introduction into the revolving spindle, and is spaced from the latter by an air gap after coupling of the toolholder.

This feature provides the advantage that standardized toolholders can be used, such as steep-angle-30 or steep-angle-40 toolholders.

Other advantages of the invention will appear from the specification and the attached drawing.

It is understood that the features that have been described before and will be explained hereafter may be used not only in the described combinations, but also in any other combination, or individually, Without leaving the scope of the present invention.

One embodiment of the invention will now be described in more detail with reference to the drawing in which.

Figure 1:
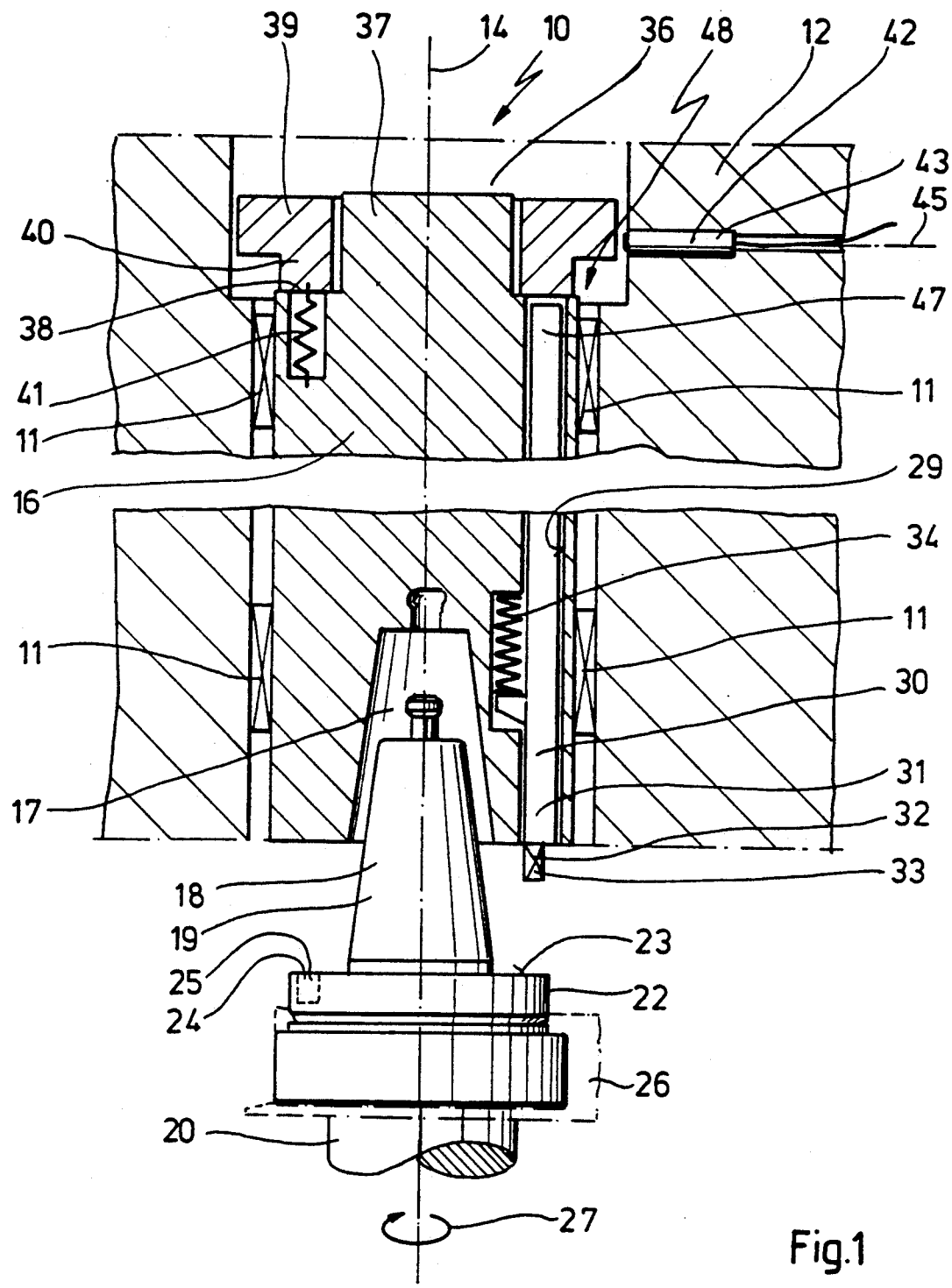
FIG. 1 shows a schematic partial and sectional view along the spindle axis of the machine tool according to the invention, partly broken away, with the toolholder in an uncoupled condition.

FIG. shows a partial and schematic sectional view of a machine tool 10. The machine tool 10 comprises a spindle 16 seated in bearings 11 in a headstock 12, for rotation about the spindle axis 14. The spindle 16 is connected in the conventional manner With drive means not shown in FIG. 1. The drive means are controlled by a sequence control—which is likewise not shown in the drawing—by means of which the spindle can be run up to different speeds.

The lower end of the spindle is provided with a receptacle 17 for a toolholder 18 which in the illustrated embodiment of the invention comprises a steep-angle taper 19 of the type usual, for example, With standardized toolholders of the steep-angle-30 or steep-angle-40 type. At its end opposite the steep-angle taper 19, the toolholder 18 is provided with a cylindrical shank 20 in which a tool not shown in FIG. 1 is clamped. Approximately midway between the steep-angle taper 19 and the cylindrical shank 20 a radially projecting annular shoulder 22 can be seen on the toolholder 18, which carries an all-around annular end face 23 facing the steep-angle taper 19. A groove provided in the end face 23, as indicated by 24, serves as recess 25, the function of which Will be described in more detail further below. As usual with standardized toolholders 18, there may be provided a plurality—for example two—of such grooves, although in FIG. 1 a single groove 24 is shown only.

The toolholder 18 is held, in a manner also known as such, by a gripper indicated at 26, Which is part of a gripper arm likewise not shown in the drawing. The gripper arm serves for picking the toolholder up from a magazine position, for example, and inserting it in the receptacle 17 of the spindle 16.

In the position illustrated in FIG. 1, the toolholder 18 is in axial alignment with the spindle axis 14, but not yet in the position in which it can be coupled with the spindle 16, although the spindle 16 is already revolving at the slow coupling speed, as indicated at 17. The coupling speed of this machine tool 10 is in the range of between 120 and 200 revolutions per minute.

A bore 29, which extends through the spindle 16 in the longitudinal direction of the spindle 16 and in parallel to the spindle axis 14, accommodates a signal rod 30 for longitudinal displacement therein. The signal rod 30 performs the function of a sensing element 31, which will be described in more detail further below, and is provided at its lower end with a tongue end 32 in the form of a key 33 which is intended to engage the recess 25 for locking the toolholder 18 on the spindle 16 against relative rotation.

The signal rod 30 is biased, by means of a compression spring indicated at 34, into the position shown in FIG. 1 in which the key 33 projects in downward direction beyond the spindle 16. The tongue end 32 and the compression spring 34 correspond to usual coupling means 35 which serve for coupling the toolholder 18 with the spindle 16.

The upper end 36 of the spindle 16, opposite the receptacle 17, carries a cylindrical extension which is concentric to the spindle axis 14 and which exhibits a reduced radial diameter, compared with the spindle 16 as such. The transition between the cylindrical extension 37 and the spindle 16 is formed by a shoulder 38.

The cylindrical extension 37 carries a stepped signal ring 39, which is concentric relative to the spindle 16 and whose lower annular flange 40 rests on the shoulder 38 when the toolholder 18 occupies the position illustrated in FIG. 1. It can be clearly seen that the annular flange 40 has a smaller outer diameter than the signal ring 39. The signal ring 39 and the annular flange 40 formed integrally therewith are made from brass in the illustrated embodiment.

The spindle 16 is provided with tension springs 41 which are distributed along its circumference. One of these springs is illustrated in FIG. 1. The tension springs 41 have their one end fixed to the spindle 16 and their other end fixed to the annular flange 40 so that they tend to pull the signal ring 39 toward the shoulder 38.

The signal ring 39 coacts with a detection unit 42 arranged stationarily in the headstock 12. In the illustrated embodiment of the invention, the detection unit 42 is configured as an inductive proximity sensor 43.

As can be seen best in FIG. 1, the inductive proximity sensor 43 is connected to the headstock 12. The proximity sensor 43 is arranged at a level indicated by 45, which is selected in such a way that the field of the inductive proximity sensor is optimally damped by the signal ring 39 when the latter rests on the shoulder 38. Although the spindle 16 revolves at the coupling speed 27, the signal ring 39 ensures in this manner permanent damping of the proximity switch 43.

In addition, it can be seen in FIG. 1 that the bore 29, in which the signal rod 30 is guided, terminates by the annular shoulder 38 so that the upper end 47 of the signal rod 30 can be brought into contact with the annular flange 40 of the signal ring 39. However, when the toolholder 18 is withdrawn from the recess 17, the annular flange 40 rests on the shoulder 38 and is released by the signal rod 30. The annular flange 40 can, however, remain constantly in contact with the signal rod 30 and, thus, support the compression spring 34, by means of the tension springs 41, in its effort to urge down the signal rod 30 and, thus, the key 33.

Thus, the sensing element 31, which comprises the signal rod 30 and the signal ring 39, and the detection unit 42 form together a sensor 48 which signals, in the condition illustrated in FIG. 1, that the tongue end is fully released.

The signal rod 31, which "travels past" the proximity switch 43 once per revolution of the spindle 16, has no influence on the field of the proximity switch 43 in the illustrated embodiment of the invention. However, it is well possible to do without the signal ring 39 and to design the signal rod 30 in such a way that its upper end 47 carries or comprises an element which can be detected by the proximity switch 43, if only once per revolution of the spindle 16.

Now, the toolholder 18 is introduced coaxially into the recess 17, either by the holder 26 moving in upward direction, or by the headstock 12 with the spindle 16 moving in downward direction. The position of the toolholder 18 is illustrated in FIG. 2.

The steep-angle taper 12 has now fully entered the recess 17, and the key 33 is in contact with the annular end face 23 of the toolholder 18. As the toolholder 18 has been introduced further into the recess 17, the signal rod 30 has been moved in upward direction, against the force of the compression spring 34 and the tension springs 41, and its upper end 47 has pushed the annular flange 40 and, thus, the signal ring 39 in upward direction, too. Due to the relatively high coupling speed 27 of the spindle 16, the initially high relative speed between the stationary toolholder 18 and the rotary spindle 16 does not allow the tongue end 32 to engage the groove 24 at the very moment when the toolholder 18 occupies its ready-to-couple position; instead, this engagement is possible only in the position illustrated in FIG. 2.

The signal ring 39 is now at the level indicated by 46, which is clearly above the level 45 of the inductive proximity switch 43. The inductive proximity switch 43, which now faces the annular flange 40, is no longer damped by the signal ring 39, and consequently it signals to the before-mentioned sequence control that the toolholder 18 is in its ready-to-couple position. The key 33 slides along the end face 23 "looking for" the groove 24.

Figure 2:
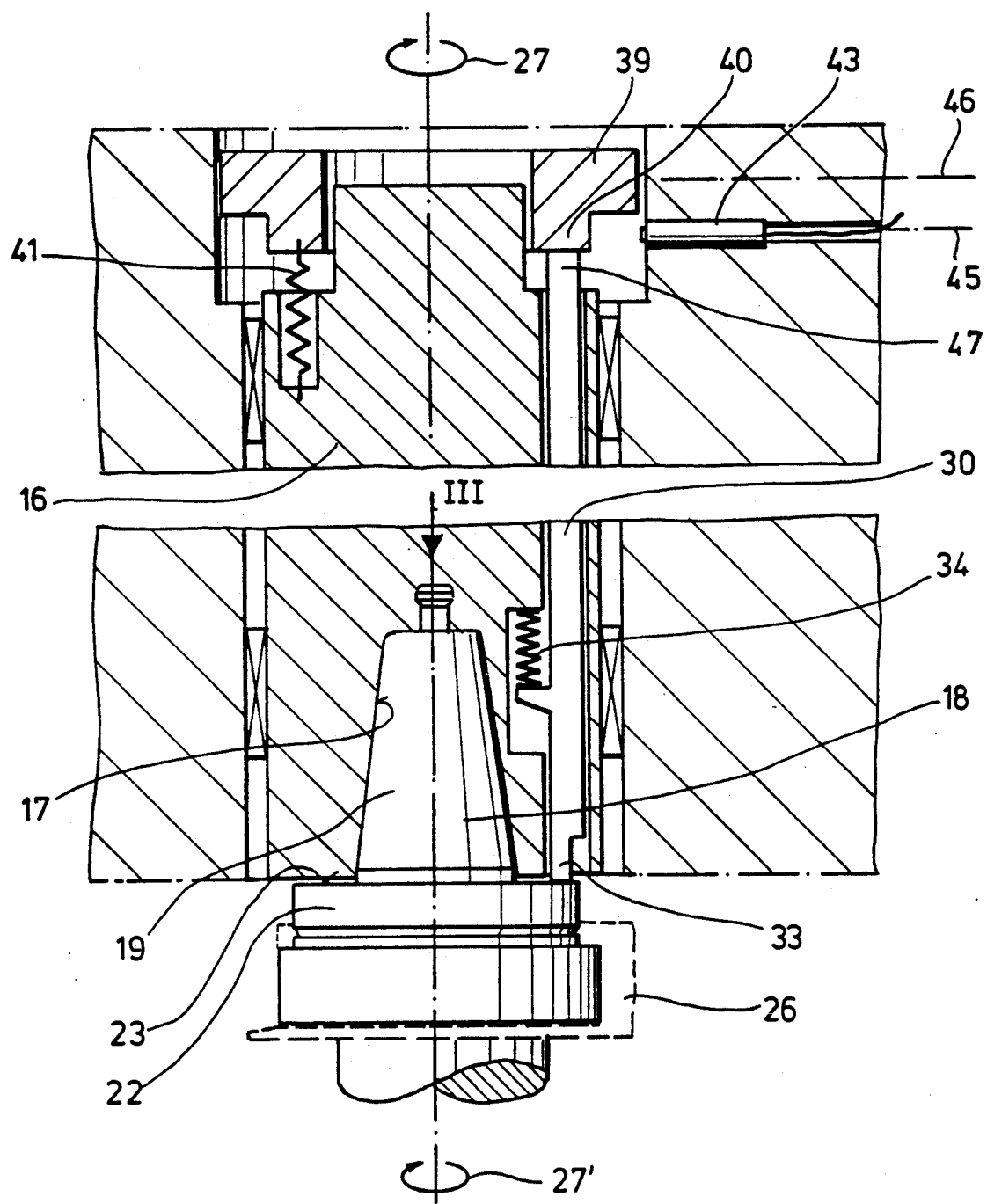
FIG. 2 shows a representation similar to that of FIG. 1, but with the toolholder in the ready-to-couple position.
Figure 3:
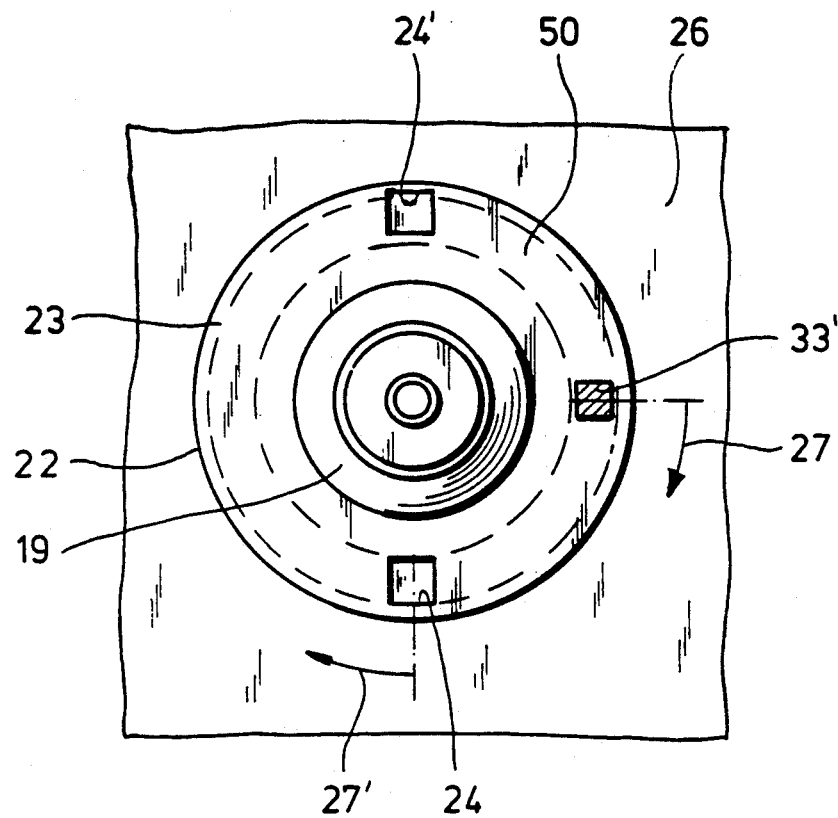
FIG. 3 shows a top view of the toolholder, along arrow III in FIG. 2.

FIG. 3 shows a view of the toolholder 18 along arrow III in FIG. 2, i.e. viewed from above. It can be seen that the toolholder 18 comprises two grooves 24 and 24', the groove 24 being located a little more inwardly in radial direction. As can be seen by the "path-"—indicated by the broken line 50—which the key 33—indicated by dashed lines at 33'—takes along the end face 23, the key 33 can engage only groove 24. It is ensured in this manner that the toolholder 18 will be coupled to the spindle 16 in the correct position, which is a requirement in particular with boring tools.

During this searching travel of the key 33, the latter revolves at the coupling speed 27 of the spindle 16, whereas the toolholder 18 revolves at the lower speed indicated at 27', which is provoked by the entraining effect of the key 33.

The speed 27' of the toolholder 18 cannot, however, reach the coupling speed 27 of the spindle 16, the toolholder 18 being guided in the gripper 26 under friction. As can be seen best in FIG. 4, the toolholder 18 comprises a V-groove 51 which is engaged under sliding friction by a corresponding matching profile of the gripper 26. The toolholder 18 is in contact by its conical surface with a matching conical surface of the gripper 26. The arrangement is such that the friction torque produced by the friction between the key 33 and the end face 23 is lower than the braking couple resulting from the friction between the toolholder 18 and the gripper 26. So, there always remains some relative movement between the spindle 16 and the toolholder 18 so that the tongue end 33 will find its way into the groove 24 along the path 50.

Figure 4:
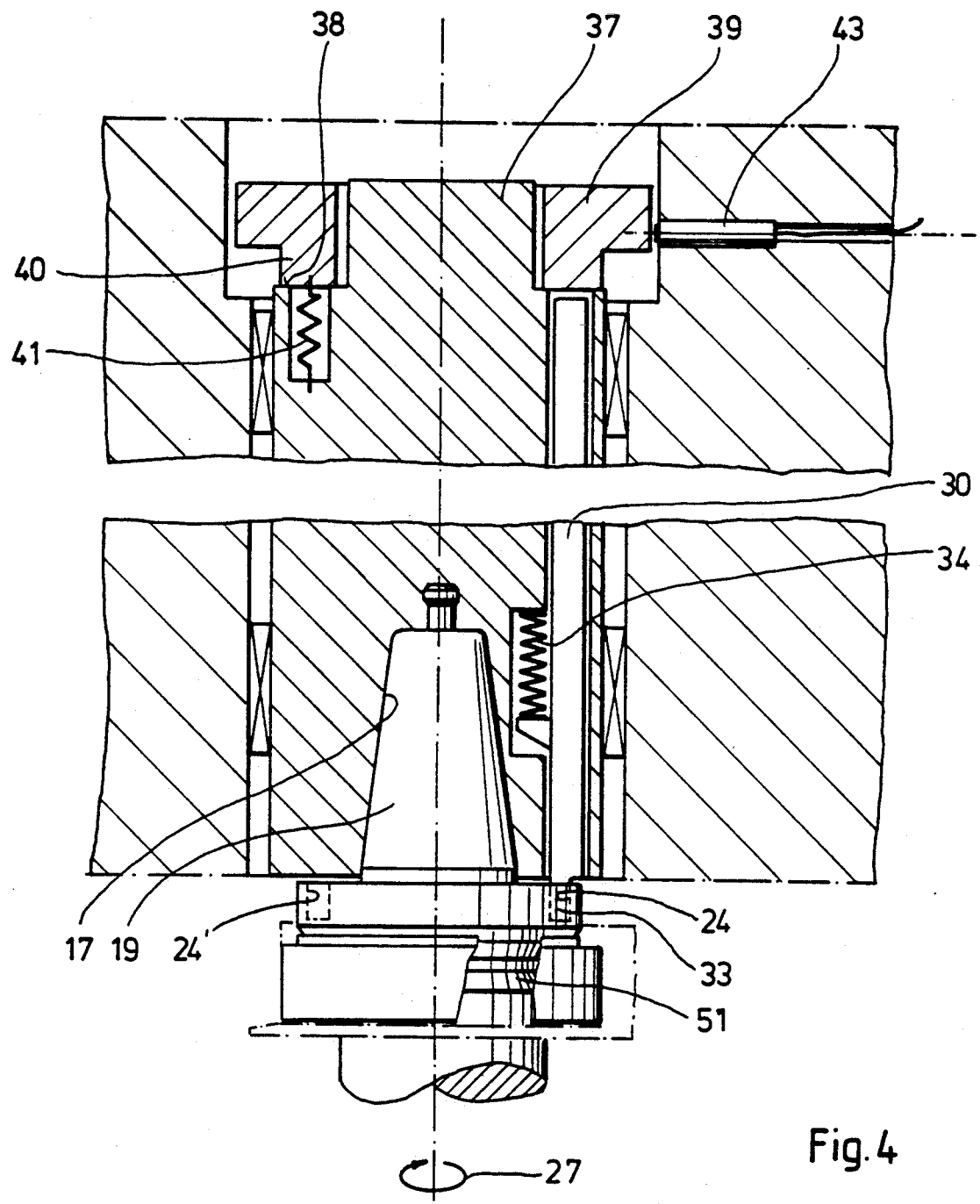
FIG. 4 shows a view similar to that of FIG. 2, but with the toolholder in the coupled condition.

This coupled condition of the toolholder 18 is illustrated in FIG. 4. The key 33 has entered the groove 24 and has, consequently, locked the toolholder 18 on the spindle 16 against relative rotation. The compression spring 34 has relaxed again, and the signal rod 30 has moved down so far that the annular flange 40 has moved again into contact with the shoulder 38, under the action of the tension spring 41.

The inductive proximity switch 43 is now damped again by the signal ring 39 so that the sensor 48 detects that the toolholder 18 occupies its coupled position.

When this signal is received, clamping means—which are not shown in the drawing for the sake of clarity—grip the steep-angle taper 19, draw it further into the receptacle 17 and lock it in this way in the spindle 16. As the toolholder 18 is clamped in the spindle 16, the V-groove 51 is released from the matching profile of the toolholder 18 so that the toolholder 18 is now permitted to revolve freely in the gripper 26.

The friction generated between the toolholder 18 and the gripper 26 during the searching travel of the key is so low that abrasion will hardly result.

We claim:

1. A machine tool comprising:
a headstock having a rotatable spindle and having motor means for rotatably driving said spindle;
gripping means for gripping a toolholder and for transferring said toolholder from a first, uncoupled position outside said spindle into a second, ready-to-couple position within said spindle;
coupling means arranged within said headstock for coupling said toolholder, when in said second, ready-to-couple position, with said spindle, whereby in such coupled condition said toolholder is locked on said spindle for rotation therewith; and
control means for controlling said motor means, said control means having sensor means for detecting said toolholder to be in said coupled condition;
said sensor means including a ring being arranged concentrically to said spindle and being journalled axially on said spindle, said ring coacting with said coupling means such that when said toolholder is in said second, ready-to-couple position, said ring is in a first axial position, whereas, when said toolholder is in said coupled condition, said ring is in a second axial position, said sensor means further including a detection unit that detects the presence of said ring in said second axial position and that generates a signal in response thereto.

2. The machine tool of claim 1, wherein said detection unit is an optical detector that is positioned adjacent to one of said first and second axial positions and that generates said signal in response to a selected one of the detected absence and presence of said ring at the one of said first and second axial positions adjacent to said optical detector.

3. The machine tool of claim 1, wherein said control means comprises sequence control means for causing said spindle to run up once said sensor means has detected that said toolholder is in said coupled condition.

4. The machine tool of claim 1, wherein said coupling means comprises catch means mounted on said spindle for displacement along a longitudinal direction relative to said spindle between an engaging and a non-engaging position, said catch means, in said coupled condition of said toolholder being in its engaging position and engaging a recess provided on said toolholder, said sensor means being arranged to detect said engaged position of said catch means relative to said spindle.

5. The machine tool of claim 1, wherein the gripping means includes a gripped that is adapted to selectively grip said toolholder during transfer of said toolholder from said first position to said second position, and that rotatably supports said toolholder when said toolholder is locked on said spindle for rotation therewith.

6. The machine tool of claim 5, wherein said gripper includes a first conical surface, said toolholder includes a second conical surface that is adapted to be placed in frictional engagement with said first conical surface when said gripper grips said toolholder, and means for placing said first and second conical surfaces in frictional engagement when said toolholder is being transferred into said second position by said gripping means and for retaining said first and second conical surfaces in spaced relation when said toolholder is locked on said spindle for rotation therewith.

7. A machine tool comprising:
a headstock having a rotatable spindle and having motor means for rotatably driving said spindle;
gripping means for gripping a toolholder and for transferring said toolholder from a first, uncoupled position outside said spindle into a second, ready-to-couple position within said spindle;
coupling means arranged within said headstock for coupling said toolholder, when in said second, ready-to-couple position, with said spindle, whereby in such coupled condition said toolholder is locked on said spindle for rotation therewith; and
control means for controlling said motor means, said control means having sensor means for detecting said toolholder to be in said coupled condition;
said sensor means including a ring being arranged concentrically to said spindle and being journalled axially on said spindle, said ring coacting with said coupling means such that when said toolholder is in said second, ready-to-couple position, said ring is in a first axial position for continuously coacting with said sensor means and for generating therein a first signal, whereas, when said toolholder is in said coupled condition, said ring is in a second axial position for coacting, likewise continuously, with said sensor means for generating therein a second signal.

8. The machine tool of claim 1, wherein said detection unit is an inductive proximity switch that is positioned adjacent to one of said first and second axial positions and that generates said signal in response to a selected one of the detected absence and presence of said ring at the one of said first and second axial positions adjacent to said optical detector.

9. The machine tool of claim 1, wherein said control means causes said spindle to rotate at a slow coupling speed while said gripping means transfers said toolholder to said second, ready-to-couple position.

* * * * *